US009448956B2

United States Patent
Kesling et al.

(10) Patent No.: US 9,448,956 B2
(45) Date of Patent: Sep. 20, 2016

(54) STUFFING BITS ON A MEMORY BUS BETWEEN DATA BURSTS

(75) Inventors: William Dawson Kesling, Davis, CA (US); Howard S. David, Portland, OR (US); Michael Williams, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 520 days.

(21) Appl. No.: 13/995,804

(22) PCT Filed: Mar. 30, 2012

(86) PCT No.: PCT/US2012/031485
§ 371 (c)(1),
(2), (4) Date: Jun. 19, 2013

(87) PCT Pub. No.: WO2013/147855
PCT Pub. Date: Oct. 3, 2013

(65) Prior Publication Data
US 2014/0156902 A1    Jun. 5, 2014

(51) Int. Cl.
*G06F 13/38* (2006.01)
*G06F 13/28* (2006.01)
*G06F 13/42* (2006.01)

(52) U.S. Cl.
CPC ........... *G06F 13/28* (2013.01); *G06F 13/4243* (2013.01)

(58) Field of Classification Search
USPC ............... 710/33–35, 308–315, 104–110
See application file for complete search history.

(56) References Cited

U.S. PATENT DOCUMENTS

| 6,426,813 | B1* | 7/2002 | Swenson | G01R 31/001 324/627 |
| 6,606,355 | B1* | 8/2003 | Wei | H04B 14/04 370/523 |
| 7,023,823 | B2* | 4/2006 | Herrmann | H04L 47/10 370/335 |
| 7,103,688 | B2* | 9/2006 | Strong | H04L 1/0002 709/233 |
| 8,166,221 | B2* | 4/2012 | Lee | G06F 13/385 710/74 |
| 8,488,710 | B2* | 7/2013 | Casaccia | H04L 1/0045 375/267 |
| 8,897,319 | B2* | 11/2014 | Fredriksson | H04L 29/0619 370/464 |
| 9,032,124 | B2* | 5/2015 | Elend | H04L 12/12 710/105 |

(Continued)

OTHER PUBLICATIONS

"Notification Concerning Transmittal of International Preliminary Report on Patentability, Chapter I of the Patent Cooperation Treaty", Oct. 9, 2014, for International Application No. PCT/US2012/031485, 7pgs.

(Continued)

*Primary Examiner* — Raymond Phan
(74) *Attorney, Agent, or Firm* — Buckley, Maschoff & Talwalker LLC

(57) ABSTRACT

According to some embodiments, a method and apparatus are provided to receive a first data burst associated with a first data line and a second data burst associated with a second data line, determine a first one or more stuff bits to be transmitted after the first data burst and a second one or more stuff bits to be transmitted after the second data burst, and output data comprising the first data burst and the first one or more stuff bits and the second data burst and the second one or more stuff bits.

19 Claims, 5 Drawing Sheets

(56) References Cited

U.S. PATENT DOCUMENTS

| | | | |
|---|---|---|---|
| 2002/0012365 A1* | 1/2002 | Mueller | H04J 3/1611 370/536 |
| 2011/0129044 A1 | 6/2011 | Zhidkow | |
| 2011/0158255 A1 | 6/2011 | Sprague | |
| 2011/0222622 A1 | 9/2011 | Chang et al. | |
| 2012/0069796 A1 | 3/2012 | Casaccia et al. | |
| 2012/0076204 A1* | 3/2012 | Raveendran | H04N 21/234327 375/240.12 |
| 2014/0223258 A1* | 8/2014 | Hartwich | G06F 13/4282 714/758 |

OTHER PUBLICATIONS

"PCT Notification of Transmittal of the International Search Report and the Written Opinion of the International Searching Authority, or the Declaration", dated Nov. 20, 2012, for International Application No. PCT/US2012/031485, 10pgs.

Chinese Office Action, dated Jul. 18, 2016, for Chinese Application No. 201280071881.5, 6pgs.

Tao fang sheng, "Data Communication Encoding for Resisting Burst Interference Noise", English-language translation, Nanjing Automation Institute of Water Conservancy and Hydrology, 1990, Phase 2, (pp. 1-7, 7 total pages).

\* cited by examiner

STUFFING BITS ON A MEMORY BUS BETWEEN DATA BURSTS

BACKGROUND OF THE INVENTION

A memory bus, such as a Double Data Rate ("DDR") bus, may typically include 64 wires in parallel for communication between a dual in-line memory module ("DIMM") and a memory controller. Computer systems that include a wireless network interface (e.g., wireless radio) often suffer from interference which originates from the memory bus. Unintentional emissions from memory buses are a significant source of broadband interference with wireless radios, creating interference in several bands that impact mobile and consumer computing devices.

Conventional methods of reducing wireless interference from memory busses rely on memory data traces being kept on internal printed circuit board routing planes to contain emissions with additional shielding material and/or absorption material being added to further reduce emissions from the memory bus. However, shielding material adds additional cost and weight to the computer system and internal-only routing requires larger board areas.

DETAILED DESCRIPTION OF EXAMPLE EMBODIMENTS

The present embodiments relate to a method of line coding for memory buses which may reduce radiated energy in selected portions of a frequency spectrum. For example, the present embodiments may manipulate binary bus data in a way somewhat opposite to scrambling. Scrambling is intended to randomize data patterns by flattening a radiated noise spectrum and reducing unwanted peaks which may increase levels of electromagnetic interference. Unlike scrambling, the present embodiments use line coding to reduce information entropy (decrease randomness) in a way that may place a notch in an emission spectrum at desired frequencies. These frequencies may be chosen based on radio frequencies that are in use by a wireless network interface device associated with a computing platform. Bit-stuffing is a form of line coding that may be practical for memory applications. According to some embodiments, by stuffing extra bits into a data stream between data bursts, levels of interference may be reduced with minimal changes to existing controllers and memory. Stuffed bits may not get stored in memory and therefore, normal memory operation and bus signal integrity may not be affected.

Figure 1:
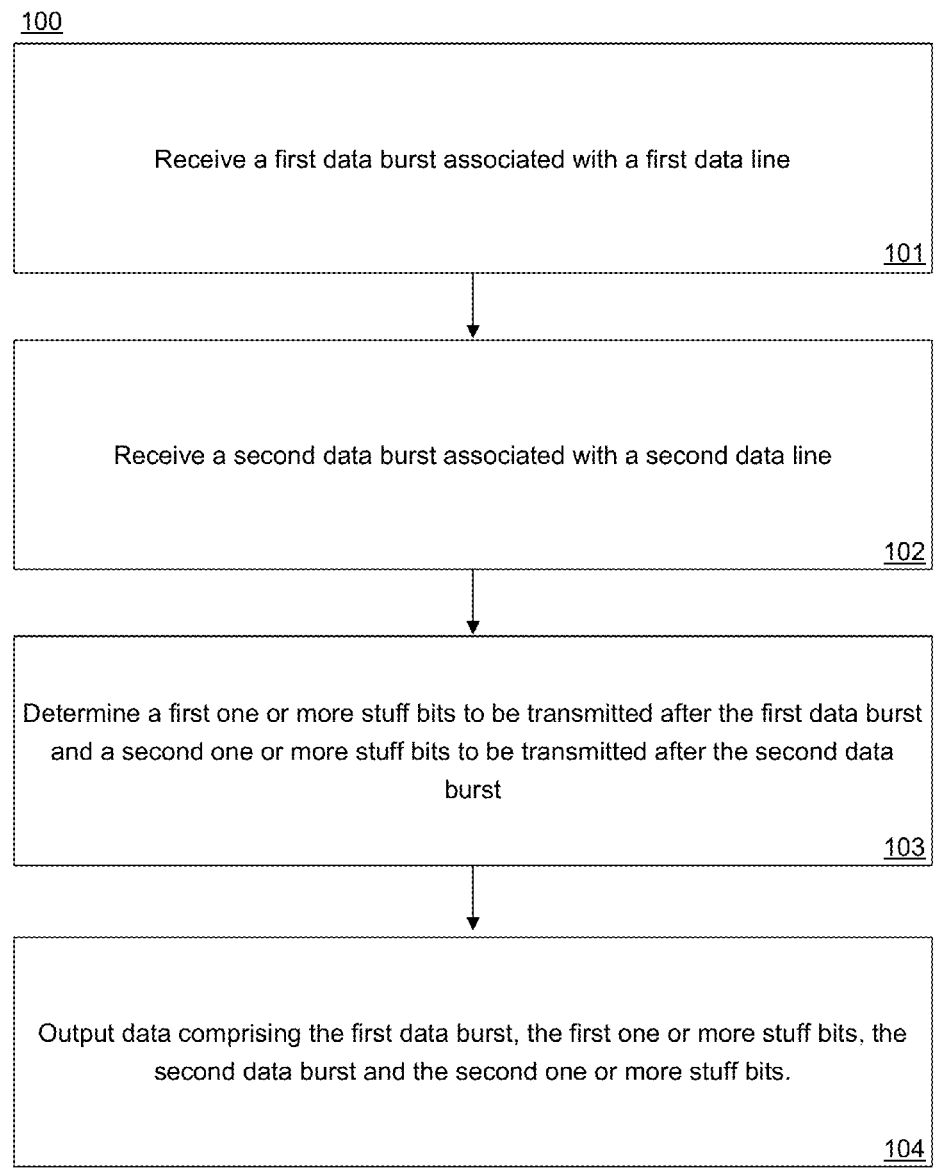
FIG. 1 illustrates a method according to some embodiments.

Referring now to FIG. 1, an embodiment of a method 100 is illustrated. The method 100 may relate to stuffing bits on a memory bus between data bursts to reduce an amount of interference produced by the memory bus. Furthermore, the method 100 may provide an electronic solution rather than a physical solution in reducing interference from memory and memory buses. The method 100 may be performed by an apparatus such as that described with respect to FIG. 6 or by a memory controller comprising a bit stuffing engine such as that described with respect to FIG. 2 and FIG. 3. Furthermore, the method 100 may be embodied on a non-transitory computer-readable medium.

At 101, a first data burst associated with a first data line is received. The first data burst may comprise a multi-bit data burst. For example, the first data burst may comprise, but is not limited to, an 8-bit or a 16-bit data burst. The first data line may be electrically coupled to a memory controller and at least one memory module. A second data burst associated with a second data line is received at 102. Similar to the first data burst, the second data burst may comprise a multi-bit data burst and the second data line may be electrically coupled to the memory controller and the at least one memory module.

Next, at 103 a first one or more stuff bits to be transmitted after the first data burst is determined and a second one or more stuff bits to be transmitted after the second data burst is determined. The first one or more stuff bits and the second one or more stuff bits may be associated with an amount of interference reduction (e.g., a depth of a notch in a bus emission spectrum) produced by a combination of the first one or more stuff bits and the second one or more stuff bits. That is, determining a combination of stuff bits that produces greater interference reduction than remaining combinations of the first one or more stuff bits and the second one or more stuff bits.

More specifically, determining an amount of interference may be associated with each possible combination of the first one or more stuff bits and the second one or more stuff bits. For example, if the first one or more stuff bits comprises 2 bits and the second one or more stuff bits comprise 2 bits, then a determination will be made based on sixteen possible combinations (e.g., [0,0], [0,1], [1,0], [1,1] for the first one or more stuff bits) and (e.g., [0,0], [0,1], [1,0], [1,1] for the second one or more stuff bits).

In some embodiments, the determination will be based on a combination of the first one or more stuff bits and the second one or more stuff bits. For example, if the determination is that a single "1" should be transmitted followed by another single "1" for the combination of stuff bits, then the first one or more stuff bits might comprise [0,1] when the second one or more stuff bits comprise [1,0]. Alternatively, the first one or more stuff bits might comprise [1,0] when the second one or more stuff bits comprise [0,1]. In this matter each option has a same bit wise sum. Other options that would also produce a same bit wise sum would be when the first one or more stuff bits comprises [1,1] and the second one or more stuff bits comprise [0,0], or when the first one or more stuff bits comprises [0,0] and the second one or more stuff bits comprise [1,1]. As described herein, the one or more stuff bits may be configurable. Furthermore, the variation of encoding may be changed based on different memory (e.g., DDR) bus rates, wireless radios, and the physical characteristics of different products. In some embodiments, determining the first one or more stuff bits and the second one or more stuff bits may be further based on an amount of residual interference remaining from a previously sent data burst. The remaining interference may be added to a level of interference associated with a current data burst and the determination of stuff bits may be based on a total amount of interference (e.g., the present data burst and any residual interference).

Data comprising the first data burst, the first one or more stuff bits, the second data burst and the second one or more stuff bits are output at 104.

In some embodiments, a third data burst associated with the first data line and a fourth data burst associated with the second data line may be received. Furthermore, a first time bubble may be created (e.g., inserted) between the first data burst and the third data burst a second time bubble may created (e.g., inserted) between the second data burst and the fourth data burst.

In some embodiments, a "water mark" of accumulated interference may be calculated by the bit-stuffing engine to reduce impact on memory performance when an accumulated amount of interference is low. For example, if the "water mark" is set to X, where X is a level of interference, the method 100 may not be executed until the level X is reached. This may be implemented via a computing platform-level agent by controlling when bit-stuffing is implemented. Furthermore, the computing platform-level agent may execute the method based on user preferences as well as levels of interference.

Figure 2:
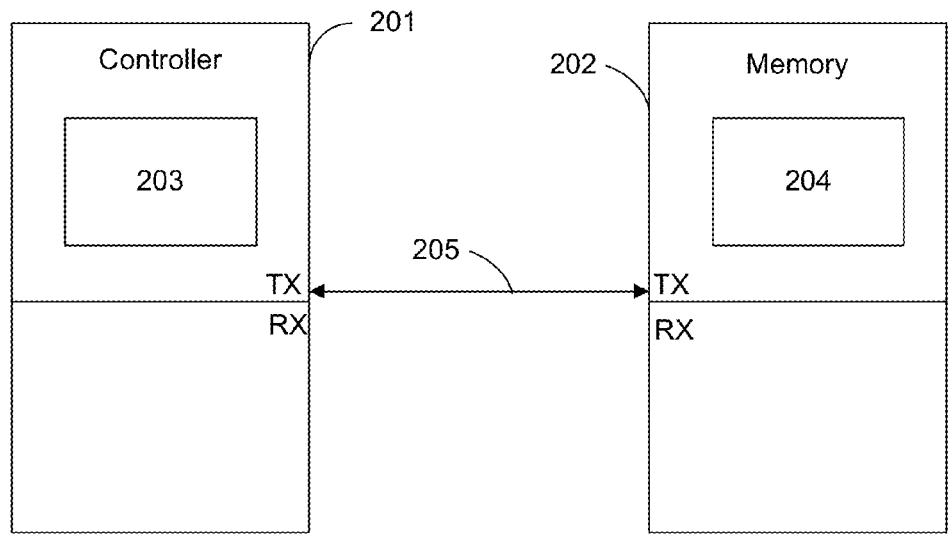
FIG. 2 illustrates a system according to some embodiments.
Figure 3:
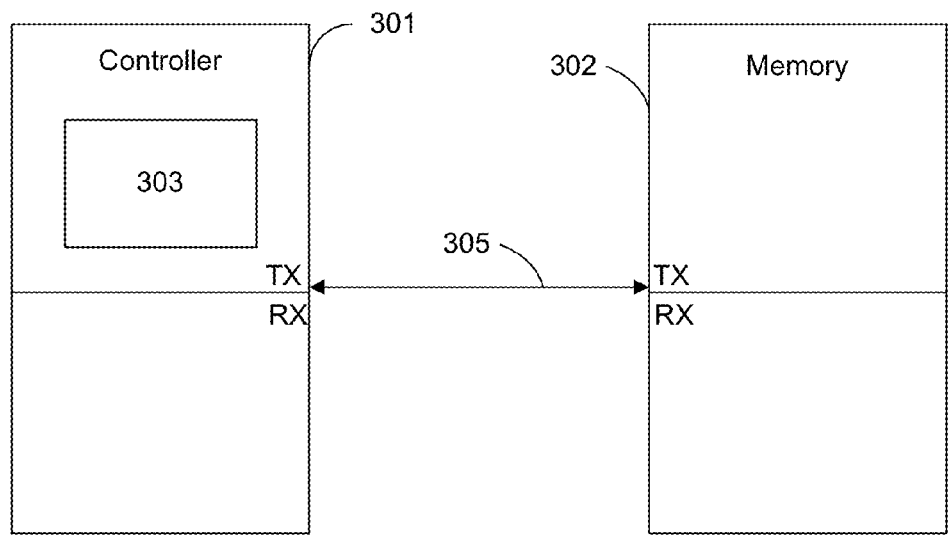
FIG. 3 illustrates a system according to some embodiments.

Now referring to FIG. 2 and FIG. 3, embodiments of system 200 and system 300 are illustrated. The system 200 may illustrate a controller 201, such as a memory controller, in communication with a memory module 202 via a bus 205. The bus 205 may comprise a dynamic random-access memory ("DRAM") link between the controller 201 and the memory module 202. The controller 201 may comprise a bit-stuffing engine 203 to generate stuffed bits at an appropriate time. While many data bursts sent to the bus 205 already comprise sufficient time between data bursts for the addition of stuffing bits without added delay, some back-to-back data bursts may require an additional clock cycle between bursts. These delays may be set by the memory controller 201 based on a timing register.

In the embodiment of system 200, bit stuffing may be implemented at both ends of a DRAM link. As illustrated, the memory 202 may also comprise a bit-stuffing engine 204.

Now referring to FIG. 3, the system 300 may illustrate a controller 303, such as a memory controller, in communication with a memory module 302 via a bus 305. In this embodiment, the bit-stuffing machine 303 may be implemented by the controller 301. By implementing bit stuffing exclusively in the controller, a need for DRAM technical enabling, DRAM re-design and the potential for DRAM die growth may be reduced.

In another embodiment, a write situation and a read situation may be handled differently. The write situation may be as described with respect to the method 100. However, in the read situation, read bits may be received by the controller 301 and stuff bits may be calculated with additional consideration given for a turn-around time before the stuff bits are sent back onto the bus from the stuffing engine 303. The results of bit stuffing may create configurable notches in the bus emission spectrum so that specific frequencies associated with wireless interference may be reduced.

Figure 4:
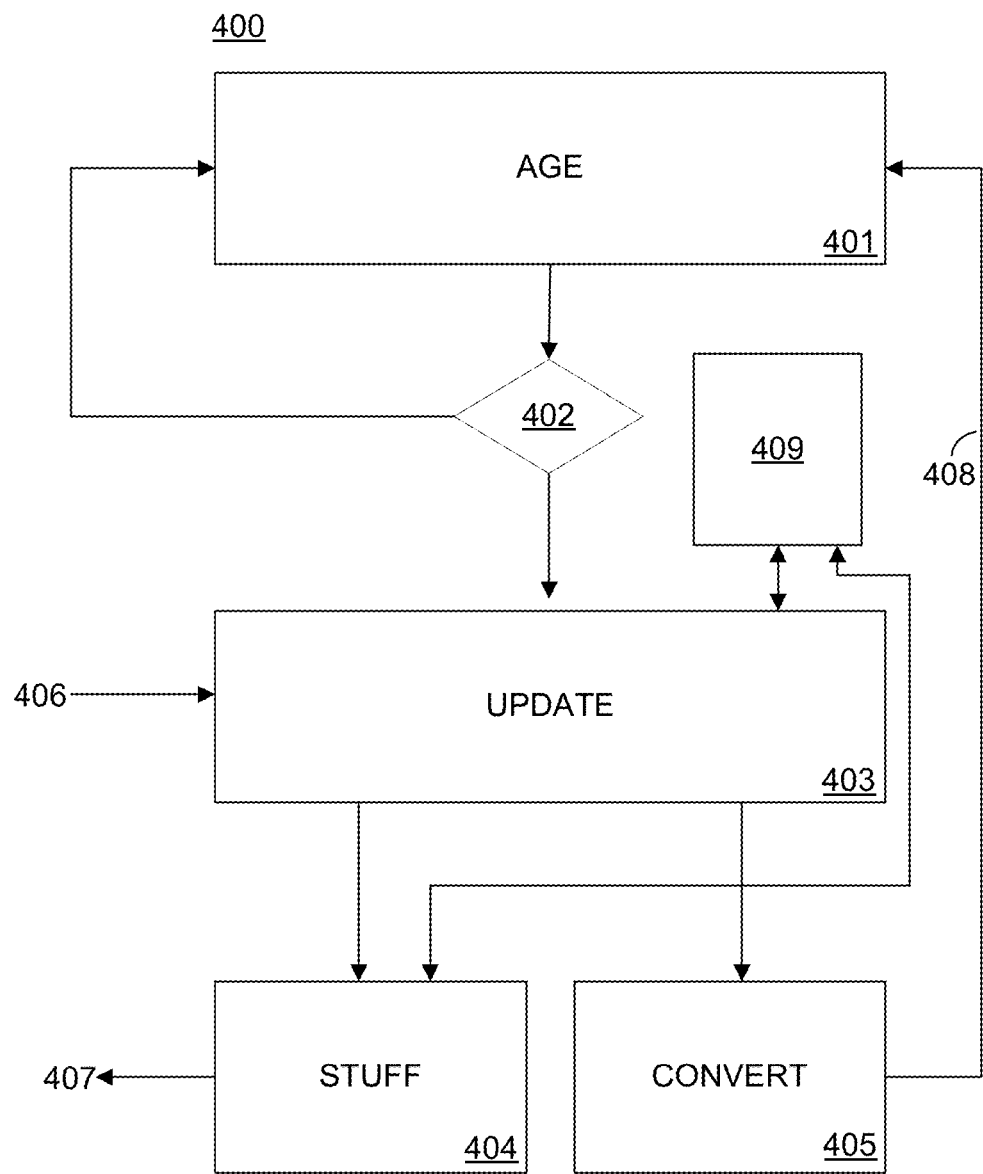
FIG. 4 illustrates a bit-stuffing engine according to some embodiments.

FIG. 4 illustrates a bit-stuffing engine 400 according to some embodiments. The bit stuffing engine 400 may add one or more stuff bits to a plurality of data lines (e.g., 2, 4, 8, etc.) of a bus simultaneously. For example, if the bit stuffing engine 400 stuffed four data lines simultaneously, there may be sixteen instantiations associated with a sixty-four data line memory bus.

The bit stuffing engine 400 may be associated with a storage block 409 to store coding information. The coding information may be calculated once for a given bus rate and radio frequency then stored for subsequent real-time use. The coding information may comprise fixed parameters which depend on a bus transfer rate and a selected radio frequency. Furthermore, the bit stuffing engine 400 may be associated with a plurality of registers to store information. In some embodiments, information may be stored in a system software profile or calculated by an operating system agent when there is a radio change event (e.g., such as a radio channel change due to cell handoff while roaming or switching from a 3G to a WiFi connection).

At 401, the bit stuffing engine 400 may process residual radio interference. The residual radio interference may comprise interference energy which has not yet been removed from data bursts associated with a memory bus. A measure of the residual radio interference may be stored in a register in a polar coordinate version of a residual phasor. The residual interface value may be initialized to zero and receive a new value after each data burst, as illustrated by outer loop 408 of FIG. 4. In the absence of a new transmit request, residual interference values (e.g., the residual phasor) may be "aged" to account for a time between data bursts. In some embodiments, aging comprises incrementing a phase and reducing a magnitude of the residual phasor. In this embodiment, values associated with the residual phasor are reset to zero when the magnitude of the residual phasor falls below a determined threshold or when a predetermined amount of time has passed without a new transmit request. The polar representation allows aging to be done with simple register operations.

Next, at 402, a determination is made if a new transmit request is to be processed. If no transmit request is to be processed, then aging continues as flow loops back to 401. If a new transmit request is to be processed, flow continues to 403.

At update block 403, databits 406 containing the bus data (e.g., eight bits of bus data) for each associated data line are received. In some embodiments, the update block 403 may be associated with two data lines as described in method 100 but may also be associated with any number of data lines, such as, four data lines, eight data lines, etc. The update block 403 may provide an address into a data byte phasor array register associated with the storage block 409. The update block 403 may comprise a residual phasor options register that represents residual interference associated with each of the various options for the stuff bits. Each entry of such a register in the update block 403 may comprise a sum of the residual phasor, the addressed data byte phasor entry register of the storage block 409, and a corresponding entry in stuff group phasor options register of the storage block 409. The least of the entries in the residual phasor options register of the update block 409 corresponds to an entry in stuff front sum options register of the storage block 409 which is used to determine the stuff bits 407 transmitted from the stuff block 404.

At the convert block 405, the residual phasor from the update section 403 may be converted from Cartesian to polar coordinates for use in the AGE section 401.

The stuff bits 407 for each of the processed data lines are send via the stuff block 404 and the stuff bits 407 themselves can take any of several possible values as long as they have bit-wise sums equal to the values chosen from the Stuff Front Sum Options register entry identified above. Mathematically, the choice of stuff bits may be under constrained. A solution may be implemented by hard-coding particular bits for each possible combination of the stuff Front Sum Options entries. Alternatively, the choice of which stuff bit possibility to choose out of the set satisfying the required bit sums may be based on power consumption or signal integrity factors.

FIGS. 5A through 5F illustrate timing diagrams for bits on a data line according to different types of bus data transfers. Strobed clock timing is illustrated on the DQS line and a data line is illustrated as the DQ line. The present embodiments illustrate 8 bit data bursts followed by 2 bit stuff bits 501/502/503/504/505. However, a data burst may contain any number of bits and any number of stuff bits may be implemented.

Figure 5A:
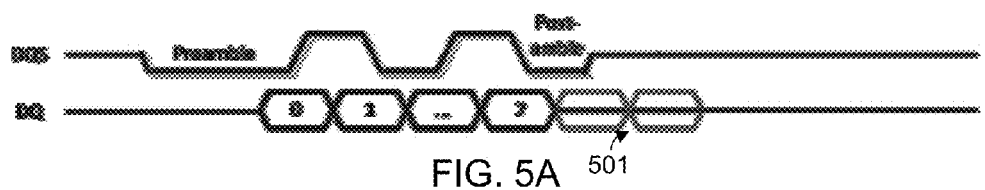
FIG. 5A illustrates a timing diagram according to some embodiments.
Figure 5B:
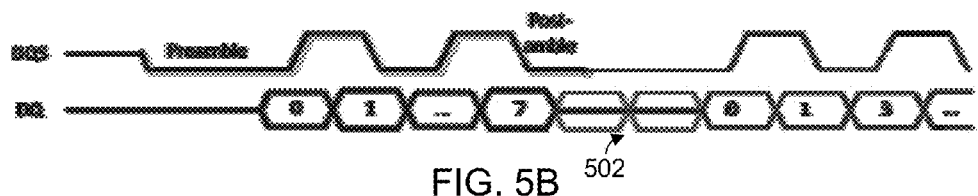
FIG. 5B illustrates a timing diagram according to some embodiments.
Figure 5C:
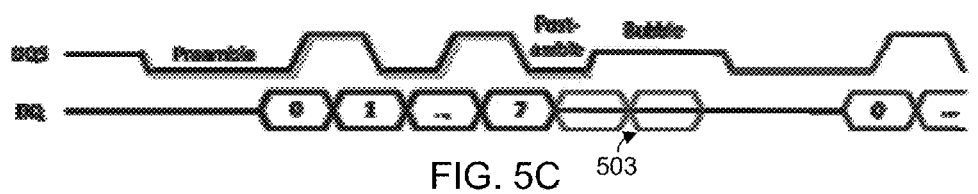
FIG. 5C illustrates a timing diagram according to some embodiments.

FIGS. 5A, 5B, and 5C illustrate three types of a data burst write. Back-to-back writes to a same bus may require that the write delay be increased from four clock cycles to five clock cycles in order to accommodate additional bits. As illustrated in FIG. 5A, after a first data burst is transmitted, two stuff bits 501 are added. In this embodiment, there are no back-to-back data bursts. However, in FIG. 5B, back-to-back data bursts are illustrated where stuff bits 502 are disposed between the two data bursts. FIG. 5C, illustrates an embodiment where two data bursts are in succession such that a memory controller has added another clock cycle (i.e., bubble) to create a time bubble to create a gap to insert two stuff bits 503.

Figure 5D:
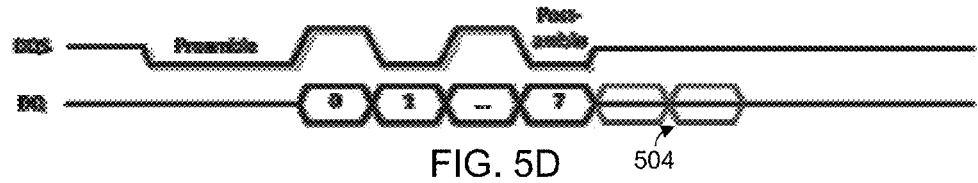
FIG. 5D illustrates a timing diagram according to some embodiments.
Figure 5E:
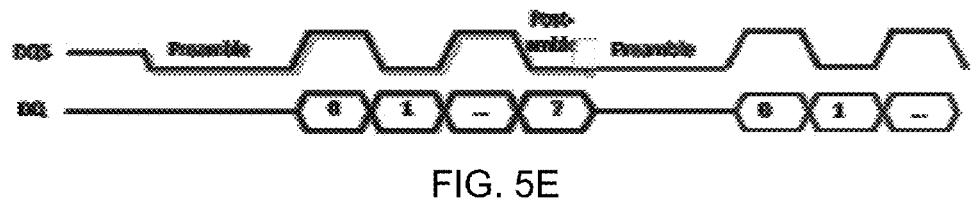
FIG. 5E illustrates a timing diagram according to some embodiments.
Figure 5F:
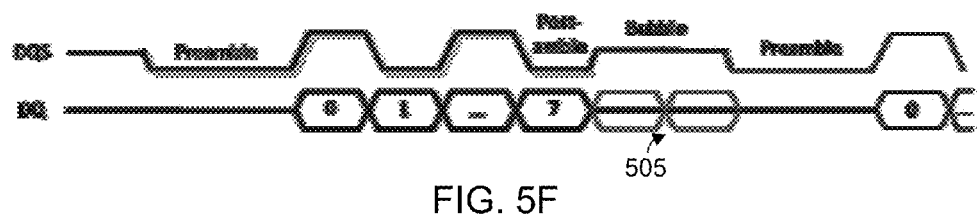
FIG. 5F illustrates a timing diagram according to some embodiments.

The read cases are illustrated in FIGS. 5D, 5E, and 5F. In some reads from different memory busses, the timing may not allow insertion of two bits without an additional clock bubble. It may be possible to insert a single stuff bit in such cases, or to increase a bus minimum read delay from four to five clock cycles. As illustrated in FIG. 5D, after a first data burst is sent, two stuff bits 504 are added. In this transfer, there are no back-to-back data bursts. FIG. 5E illustrated a case in which not enough time exists to insert two stuff bits. So, as illustrated in FIG. 5F, another clock cycle is added (i.e. bubble) to create a time bubble to insert two stuff bits 505. This second case also ensures time for insertion of two stuff bits in cases of back-to-back reads on a same bus.

Figure 6:
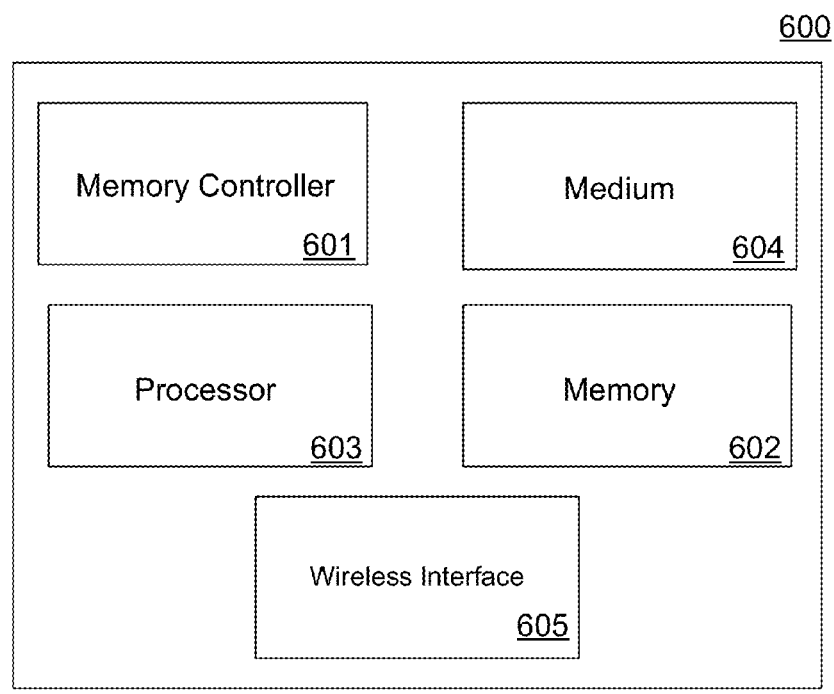
FIG. 6 illustrates a computing system according to some embodiments.

Now referring to FIG. 6, an embodiment of an apparatus 600 is illustrated. The apparatus 600 may comprise a memory controller 601, a main memory 602, a processor 603, a medium 604, and a wireless interface 605. According to some embodiments, the apparatus 600 may further comprise a digital display port, such as a port adapted to be coupled to a digital computer monitor, television, portable display screen, or the like.

The memory controller 601 may comprise a circuit which manages a flow of data going to and from the memory. In some embodiments, the memory controller 601 may comprise a separate chip. However, in other embodiments, the memory controller may be integrated into another chip, such as on a die of the processor 603.

The main memory 602 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 602 may comprise a plurality of memory modules.

The processor 603 may include or otherwise be associated with dedicated registers, stacks, queues, etc. that are used to execute program code and/or one or more of these elements may be shared there between. In some embodiments, the processor 603 may comprise an integrated circuit. In some embodiments, the processor 603 may comprise circuitry to perform a method such as, but not limited to, the method described with respect to FIG. 1. Bit-Stuffing may be associated with codewords that are generated from bits in a bit stream. The processor may transmit the codewords along an N-bit bus, where, for example, N may include or correspond to the number of bits in each codeword. A phasor may be determined for each bit in the bit stream within a predetermined spectral frequency range that is less than an entire spectral frequency spectrum over which data communications takes place for the terminal. According to some embodiments, the phasor for each bit is determined at only a single spectral frequency. Moreover, the phasor for each bit may be determined in a variety of ways. One way begins with the understanding that a single data bit on a bus may be spectrally represented by a pulse at a single frequency over time. Each pulse (bit) in a bit stream contributes to the net spectrum of the bit stream waveform, and may be represented by the following Equation (1):

$$H(f) = A\ \mathrm{sinc}(f/BR) \times e^{-j2\pi f BR} \qquad (1)$$

A may be the pulse amplitude, BR may be the bus bit rate, BT may be the bit time (inverse of bit rate), and b may be the bit location (measured in bit times from zero). The phasor of a data bit may be defined as a complex vector (a vector in the complex plane) given by the spectral magnitude and phase angle of the bit taken at a single frequency of interest. In bit stuffing, stuff or dummy bits are chosen to minimize a running phasor sum.

The medium 604 may comprise any computer-readable medium that may store processor-executable instructions to be executed by the processor 603 and in some cases the memory controller 601 (e.g., the method 100). For example, the medium 604 may comprise a non-transitory tangible medium such as, but is not limited to, a compact disk, a digital video disk, flash memory, optical storage, random access memory, read only memory, or magnetic media.

The wireless interface 605 may comprise a wireless network interface controller to provide connectivity to a radio-based computer network. The wireless interface 605 may comprise an antenna to facilitate communication to the radio-based computer network.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A method comprising:
   receiving a first data burst associated with a first data line;
   receiving a second data burst associated with a second data line;
   determining a first one or more stuff bits to be transmitted after the first data burst and a second one or more stuff bits to be transmitted after the second data burst, wherein the first one or more stuff bits is one or more non information bits added into the first data line and the second one or more stuff bits is one or more non information bits added into the second data line; and
   outputting data comprising the first data burst, the first one or more stuff bits, the second data burst and the second one or more stuff bits.

2. The method of claim 1, wherein the determining is based on an amount of interference reduction produced by a combination of the first one or more stuff bits and the second one or more stuff bits.

3. The method of claim 1, further comprising:
   receiving a third data burst associated with the first data line and a fourth data burst associated with the second data line.

4. A method comprising:
   receiving a first data burst associated with a first data line;
   receiving a second data burst associated with a second data line;
   determining a first one or more stuff bits to be transmitted after the first data burst and a second one or more stuff bits to be transmitted after the second data burst, wherein the determining is based on an amount of interference reduction produced by a combination of the first one or more stuff bits and the second one or more stuff bits; and
   outputting data comprising the first data burst, the first one or more stuff bits, the second data burst and the second one or more stuff bits; and
   wherein the determining the first one or more stuff bits and the second one or more stuff bits comprises:
   determining an amount of interference reduction associated with each possible combination of the first one or more stuff bits and the second one or more stuff bits; and
   determining a combination that produces more interference reduction than remaining combinations of the first one or more stuff bits and the second one or more stuff bits.

5. The method of claim 4, wherein determining the first one or more stuff bits and the second one or more stuff bits is further based on an amount of residual interference from a previous data burst.

6. A method comprising:
   receiving a first data burst associated with a first data line;
   receiving a second data burst associated with a second data line;
   determining a first one or more stuff bits to be transmitted after the first data burst and a second one or more stuff bits to be transmitted after the second data burst and
   outputting data comprising the first data burst, the first one or more stuff bits, the second data burst and the second one or more stuff bits;
   receiving a third data burst associated with the first data line and a fourth data burst associated with the second data line;
   creating a first time bubble between the first data burst and the third data burst; and
   creating a second time bubble between the second data burst and the fourth data burst.

7. The method of claim 6, wherein the first time bubble and the second time bubble are associated with a register of a memory controller.

8. An apparatus comprising:
   a memory bus comprising a plurality of data lines;
   a memory controller, the memory controller to:
   receive a first data burst associated with a first data line;
   receive a second data burst associated with a second data line;
   determine a first one or more stuff bits to be transmitted after the first data burst and a second one or more stuff bits to be transmitted after the second data burst based on an amount of interference reduction produced by a combination of the first one or more stuff bits and the second one or more stuff bits, wherein the first one or more stuff bits is one or more non information bits added into the first data line and the second one or more stuff bits is one or more non information bits added into the second data line; and
   output data comprising the first data burst, the first one or more stuff bits, the second data burst and the second one or more stuff bits.

9. An apparatus comprising:
   a memory bus comprising a plurality of data lines;
   a memory controller, the memory controller to:
   receive a first data burst associated with a first data line;
   receive a second data burst associated with a second data line;
   determine a first one or more stuff bits to be transmitted after the first data burst and a second one or more stuff bits to be transmitted after the second data burst based on an amount of interference reduction produced by a combination of the first one or more stuff bits and the second one or more stuff bits; and
   output data comprising the first data burst, the first one or more stuff bits, the second data burst and the second one or more stuff bits;

wherein determining the first one or more stuff bits and the second one or more stuff bits comprises:
determining an amount of interference reduction associated with each possible combination of the first one or more stuff bits and the second one or more stuff bits; and
determining a combination that produces more interference reduction with the wireless interface than remaining combinations of the first one or more stuff bits and the second one or more stuff bits.

10. The apparatus of claim 9, wherein determining the first one or more stuff bits and the second one or more stuff bits is further based on an amount of residual interference from a previous data burst.

11. The apparatus of claim 8, wherein the memory controller is to further:
receive a third data burst associated with the first data line and a fourth data burst associated with the second data line.

12. An apparatus comprising:
a memory bus comprising a plurality of data lines;
a memory controller, the memory controller to:
receive a first data burst associated with a first data line;
receive a second data burst associated with a second data line;
determine a first one or more stuff bits to be transmitted after the first data burst and a second one or more stuff bits to be transmitted after the second data burst based on an amount of interference reduction produced by a combination of the first one or more stuff bits and the second one or more stuff bits; and
output data comprising the first data burst, the first one or more stuff bits, the second data burst and the second one or more stuff bits;
wherein the memory controller is to further:
receive a third data burst associated with the first data line and a fourth data burst associated with the second data line;
create a first time bubble between the first data burst and the third data burst; and
create a second time bubble between the second data burst and the fourth data burst.

13. The apparatus of claim 12, wherein the first time bubble and the second time bubble are associated with a register of the memory controller.

14. A medium comprising instructions that when executed by a processor perform a method, the method comprising:
receiving a first data burst associated with a first data line;
receiving a second data burst associated with a second data line;
determining a first one or more stuff bits to be transmitted after the first data burst and a second one or more stuff bits to be transmitted after the second data burst based on an amount of interference reduction produced by a combination of the first one or more stuff bits and the second one or more stuff bits, wherein the first one or more stuff bits is one or more non information bits added into the first data line and the second one or more stuff bits is one or more non information bits added into the second data line; and
outputting data comprising the first data burst, the first one or more stuff bits, the second data burst and the second one or more stuff bits.

15. The medium of claim 14, further comprising:
receiving a third data burst associated with the first data line and a fourth data burst associated with the second data line.

16. A medium comprising:
receiving a first data burst associated with a first data line;
receiving a second data burst associated with a second data line;
determining a first one or more stuff bits to be transmitted after the first data burst and a second one or more stuff bits to be transmitted after the second data burst based on an amount of interference reduction produced by a combination of the first one or more stuff bits and the second one or more stuff bits; and
outputting data comprising the first data burst, the first one or more stuff bits, the second data burst and the second one or more stuff bits;
wherein the determining the first one or more stuff bits and the second one or more stuff bits comprises:
determining an amount of interference reduction associated with each possible combination of the first one or more stuff bits and the second one or more stuff bits; and
determining a combination that produces less interference than remaining combinations of the first one or more stuff bits and the second one or more stuff bits.

17. The medium of claim 16, wherein the determining of first one or more stuff bits and the second one or more stuff bits is further based on an amount of residual interference from a previous data burst.

18. A medium comprising instructions that when executed by a processor perform a method, the method comprising:
receiving a first data burst associated with a first data line;
receiving a second data burst associated with a second data line;
determining a first one or more stuff bits to be transmitted after the first data burst and a second one or more stuff bits to be transmitted after the second data burst based on an amount of interference reduction produced by a combination of the first one or more stuff bits and the second one or more stuff bits;
outputting data comprising the first data burst, the first one or more stuff bits, the second data burst and the second one or more stuff bits;
receiving a third data burst associated with the first data line and a fourth data burst associated with the second data line;
creating a first time bubble between the first data burst and the third data burst; and
creating a second time bubble between the second data burst and the fourth data burst.

19. The medium of claim 18, wherein the first time bubble and the second time bubble are associated with a register of a memory controller.

* * * * *